(12) United States Patent
Matsute

(10) Patent No.: US 6,529,253 B1
(45) Date of Patent: Mar. 4, 2003

(54) FILTER FOR ADJUSTING AMOUNT OF LIGHT

(75) Inventor: Masataka Matsute, Kanagawa (JP)

(73) Assignee: Sony Corporation, Tokyo (JP)

( * ) Notice: Subject to any disclaimer, the term of this patent is extended or adjusted under 35 U.S.C. 154(b) by 180 days.

(21) Appl. No.: 09/590,705

(22) Filed: Jun. 8, 2000

(30) Foreign Application Priority Data

Jun. 9, 1999 (JP) .......................................... P11-162698

(51) Int. Cl.[7] .............................................. G02F 1/133
(52) U.S. Cl. ........................................ 349/96; 349/165
(58) Field of Search ............................. 359/75; 349/96, 349/104, 56, 165

(56) References Cited

U.S. PATENT DOCUMENTS

| | | | | |
|---|---|---|---|---|
| 3,874,163 A | * | 4/1975 | Ikeno | 368/242 |
| 4,111,533 A | * | 9/1978 | Nakamura et al. | 349/58 |
| 4,530,572 A | * | 7/1985 | Huffman | 350/346 |
| 4,767,190 A | * | 8/1988 | Dir et al. | 349/3 |
| 5,150,231 A | * | 9/1992 | Iwamoto et al. | 359/44 |
| 5,327,271 A | * | 7/1994 | Takeuch et al. | 359/75 |
| 5,488,496 A | * | 1/1996 | Pine | 349/96 |
| 5,598,231 A | * | 1/1997 | Lin | 351/49 |
| 6,039,893 A | * | 3/2000 | Arakawa et al. | |

* cited by examiner

Primary Examiner—Kenneth Parker
(74) Attorney, Agent, or Firm—Sonnenschein, Nath & Rosenthal

(57) ABSTRACT

A filter for adjusting an amount of light, in which an ND filter 7 is loaded and unloaded by aperture blades not shown in the figure; (a) the ND filter 7 is loaded in the light path, and the liquid crystal cell is controlled to make the transmittance minimum by the controlling voltage, so as to attain the minimum transmittance; (b) the ND filter 7 is unloaded from the light path, and the liquid crystal cell is controlled to make the transmittance maximum by the controlling voltage, so as to attain the maximum transmittance; and the liquid crystal is controlled to have transmittance of an intermediate level by the controlling voltage, so as to attain intermediate transmittance.

20 Claims, 9 Drawing Sheets

POLARIZING PLATE
LOADED IN LIGHT PATH

PLARIZAING PLATE
UNLOADED IN LIGHT PATH

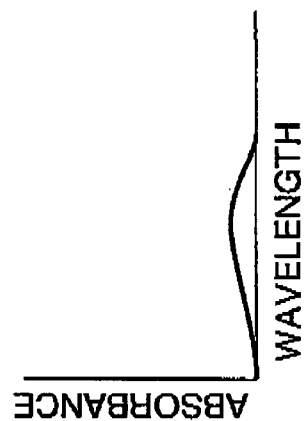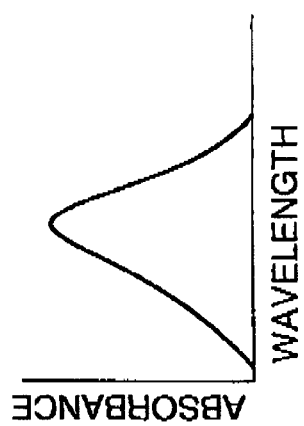
FIG.3A  FIG.3B  FIG.4A  FIG.4B
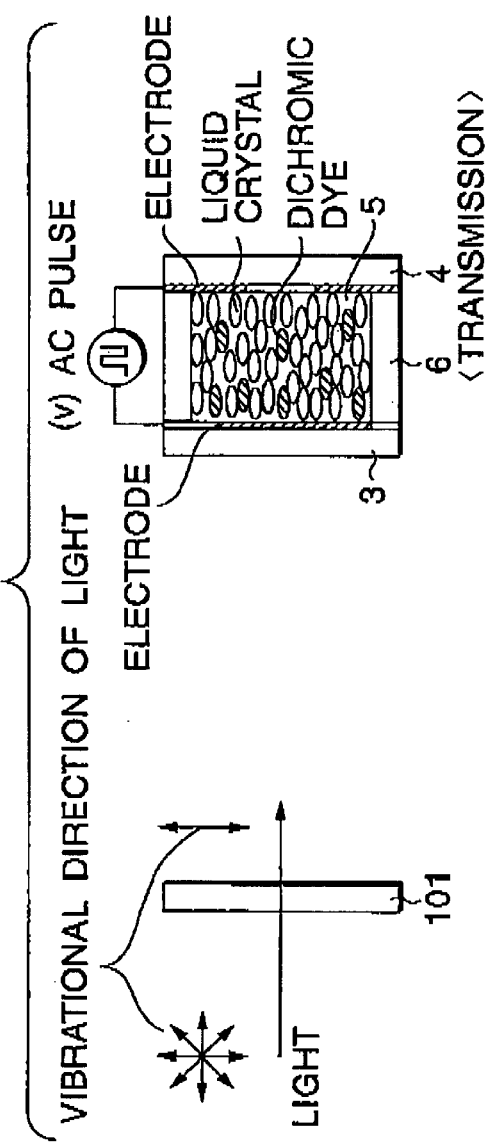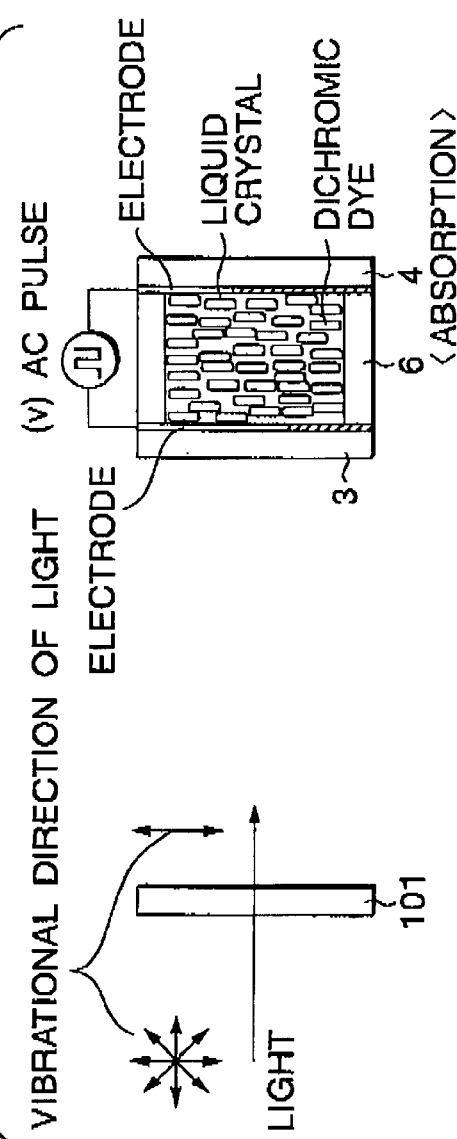

ND FILTER LOADED
IN LIGHT PATH

ND FILTER UNLOADED
IN LIGHT PATH

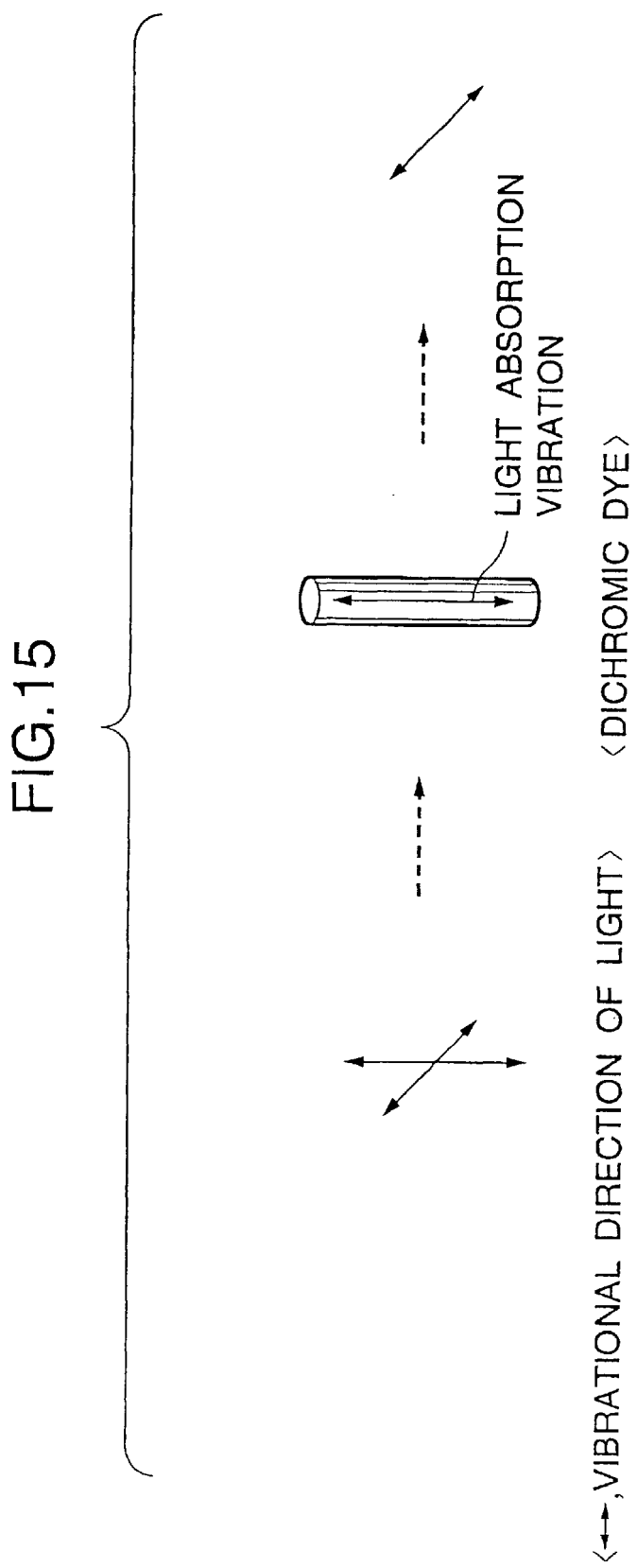

ically selected depending on the specification of the system.

FILTER FOR ADJUSTING AMOUNT OF LIGHT

RELATED APPLICATION DATA

The present application claims priority to Japanese Application No. P11-162698 filed Jun. 9, 1999 which application is incorporated herein by reference to the extent permitted by law.

FIELD OF THE INVENTION

The present invention relates to an optical filter for adjusting an amount of light in the visible region, and it particularly relates to a filter for adjusting an amount of light applied to a filter of a variable light amount type for a camera and a video camcorder, which is applied, for example, in a lens system of a camera or a video camcorder as an ND filter (neutral density filter) for adjusting an amount of light on taking pictures. Therefore, it requires a wide range of variation in an amount of light, and it is important that the adjusted light does not suffer from change in color tone.

BACKGROUND OF THE INVENTION

It has been known that an ND filter (neutral density filter) is used for restricting an amount of light transmitted through a lens system of a camera and a video camcorder.

As described in JP-A-3-35531U and JP-A-5-40294, a conventional ND filter has a fixed density, and a filter is appropriately selected depending on the specification of the system.

The application of the conventional ND filter involves a problem in that continuous change in density cannot be realized. Accordingly, adjustment of an amount of light utilizing electrochromism (EC) is being tried. In a system utilizing EC, electrodes are provided inside two substrates facing each other, and an electric field is applied between the electrodes to deposit silver or tungsten on the surface of the electrode, whereby the amount of light is adjusted.

However, the system utilizing EC involves a problem in that the transmitted light suffers change in wavelength depending on the course of deposition, i.e., the initial stage of deposition, the midstream of deposition and the completion of deposition, and thus neutral light cannot be obtained (as described, for example, in JP-A-10-133236).

Thus, an optical filter for adjusting an amount of light that solves the problem associated with the conventional art is being demanded.

SUMMARY OF THE INVENTION

The invention has been completed taking the conventional art into consideration, and an object thereof is to provide a filter for adjusting an amount of light that has a stable constitution realizing change in the amount of light in a wide range without causing a change in a color tone upon a change in the amount of light.

The invention relates to, as a first embodiment, a filter for adjusting an amount of light comprising a liquid crystal cell and a polarizing plate, the liquid crystal cell comprising two transparent substrates each having a transparent electrode facing each other, and a guest-host type liquid crystal filled in a gap between the transparent substrates, and the polarizing plate being loadable and unloadable in a light path incident on the liquid crystal cell.

The invention also relates to, as a second embodiment, a filter for adjusting an amount of light comprising a liquid crystal cell and an optical filter, the liquid crystal cell comprising two transparent substrates each having a transparent electrode facing each other, and a guest-host type liquid crystal filled in a gap between the transparent substrates, and the optical filter being loadable and unloadable in a light path incident on the liquid crystal cell.

In the invention, a combination of at least one polarizing plate or neutral optical filter that can be loaded and unloaded in the light path and a guest-host type liquid crystal cell (a nematic liquid crystal cell or a liquid crystal cell of a phase change type (host) containing a dichroic dye (guest)) fixed on the light path is used, whereby adjustment of an amount of light for change of an amount of incident light can be conducted, and the color tone of the light, the amount of which is adjusted, is slightly changed.

BRIEF DESCRIPTION OF THE DRAWINGS

FIG. 2A corresponds to the state where the polarizing plate is loaded, and FIG. 2B corresponds to the state where the polarizing plate is unloaded.

FIG. 3A is a schematic diagram showing the first mode of orientation of the guest-host liquid crystal in the operation of the first embodiment where the polarizing plate is loaded, and FIG. 3B is a graph showing a spectrum characteristic diagram of light absorbance thereon.

FIG. 4A is a schematic diagram showing the second mode of orientation of the guest-host liquid crystal in the operation of the first embodiment where the polarizing plate is loaded, and FIG. 4B is a graph showing a spectrum characteristic diagram of light absorbance thereon.

FIG. 15 is a schematic diagram showing the characteristics of a dichroic dye.

DETAILED DESCRIPTION OF THE INVENTION

The filter for adjusting an amount of light is applied in a lens system of a camera or a video camcorder as an ND filter (neutral density filter) for adjusting an amount of light on taking picture. Therefore, it requires a wide range of variation in an amount of light, and it is important that the adjusted light does not suffer from change in color tone.

Figure 1:
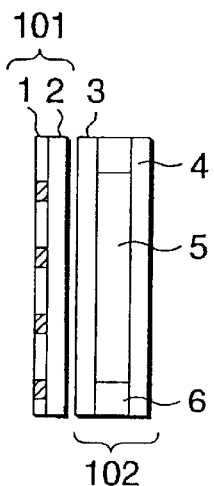
FIG. 1 is a schematic diagram showing an important part of an example of the first embodiment of a filter for adjusting an amount of light of the invention.

FIG. 1 is a schematic diagram showing the important part of the first embodiment of the filter for adjusting an amount of light of the invention. As a polarizing plate 101, a transparent substrate 2 having a polarizing filter 1 having high polarizing degree and high transmittance adhered thereto is attached, for example, to aperture blades not shown in the figure on the incident light side of the light path. A glass or plastic substrate is used as the transparent substrate 2.

A liquid crystal cell 102 of a guest-host type is arranged directly on a back surface of the polarizing plate 101. The liquid crystal cell 102 has a structure, in which two transparent substrates 3 and 4 are adhered each other with a sealing material 6 maintaining a prescribed gap, and a guest-host type liquid crystal 5 is filled in the gap.

The guest-host type liquid crystal 5 is a liquid crystal system formed by dissolving a dichroic dye (guest) in a liquid crystal (host). A dichroic dye is a dye having absorption anisotropy as shown in FIG. 15, which generally has a long stick-like molecular structure and has a light absorption axis in substantially the same direction as the longitudinal direction of the molecule. Typical examples thereof include a diazo dye, a triazo dye and an anthraquinone dye. Some of the dichroic dyes exhibit absorption in the short axis direction, but they have a small dichroic ratio.

That is, a dichroic dye has, as parameters showing the characteristics thereof, the order of the light absorbance and the dichroic ratio, which is a ratio of the component of absorbance in the direction parallel to the absorption axis and the component of absorbance in the direction perpendicular to the absorption axis. The dichroic ratio is generally about from 10 to 12 in a liquid crystal.

The liquid crystal used herein utilizes a nematic phase having no twist, the orientation thereof is controlled by an electric field. As the dichroic dye, dyes having high light absorption and a high dichroic ratio are preferred. In order that the adjusted light has a neutral color tone, it is preferred that plural dichroic dyes are mixed, and the characteristic parameters of the mixed dichroic dyes substantially agree with each other. The color tone of the adjusted light thus can be neutral, and change in color tone does not occur in an intermediate tone. The intermediate tone used herein means a variable level between the maximum and the minimum of the variable dynamic range of the filter for adjusting an amount of light.

Figure 2A:
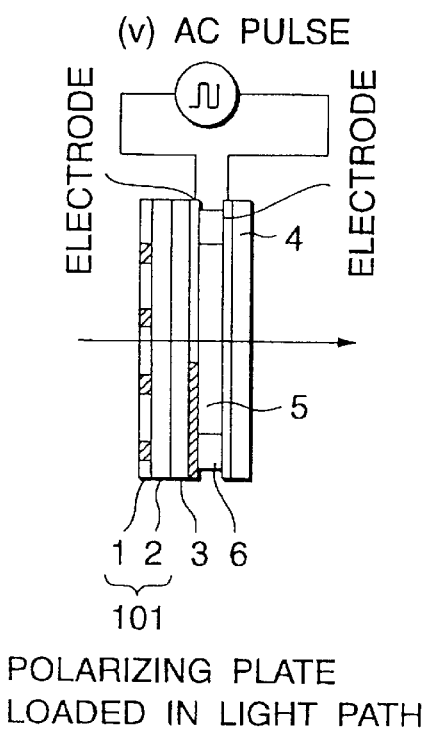
FIGS. 2A and 2B are schematic diagrams showing operation of the first embodiment.
Figure 2B:
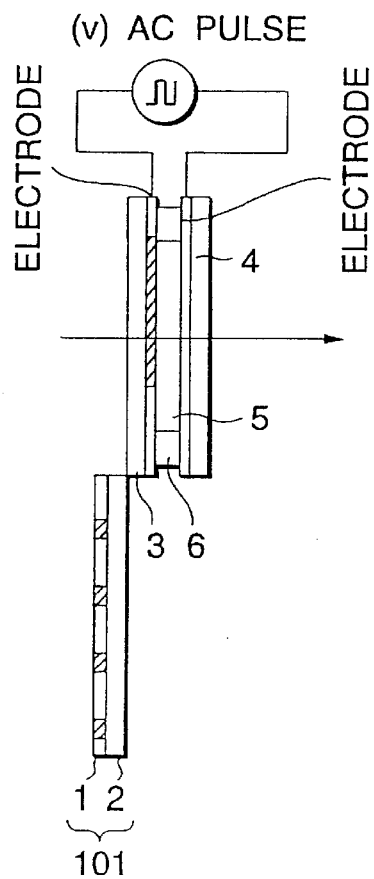

FIGS. 2A and 2B are schematic diagrams showing the mode of operation of the filter for adjusting an amount of light having the constitution shown in FIG. 1. In the combination of the polarizing plate 101 and the guest-host type liquid crystal cell 102 shown in FIGS. 2A and 2B, the polarizing plate 101 can be loaded and unloaded in the light path toward the liquid crystal cell 102 by aperture blades not shown in the figures.

The state shown in FIG. 2A where the polarizing plate 101 is loaded in the light path toward the liquid crystal cell 102 will be described with reference to FIGS. 3A, 3B, 4A and 4B. Counter electrodes are provided on the substrates 3 and 4 to face each other, and the liquid crystal molecules are oriented by an AC pulse voltage applied to the counter electrodes. The orientation degree is controlled by the amplitude of the AC pulse voltage. That is, the control of a light amount in the intermediate tone can be conducted by changing the amplitude of the AC pulse voltage.

For example, when the liquid crystal molecules are controlled by an electric field between the substrates 3 and 4 to be oriented in the direction perpendicular to the vibration direction of the light polarized by the polarizing plate 1 (FIG. 3A), i.e., when the liquid crystal is oriented in the direction perpendicular to the substrates 3 and 4, substantially no absorption occurs by the dichroic dye, and the polarized light is transmitted (FIG. 3I).

When the liquid crystal molecules are controlled by an electric field between the substrates 3 and 4 to be oriented in the direction parallel to the vibration direction of the light polarized by the polarizing plate 1 (FIG. 4A), i.e., when the liquid crystal is oriented in the direction parallel to the substrates 3 and 4, the polarized light is absorbed by the dichroic dye, and the amount of transmitted light becomes minimum (FIG. 4II).

Figure 5:
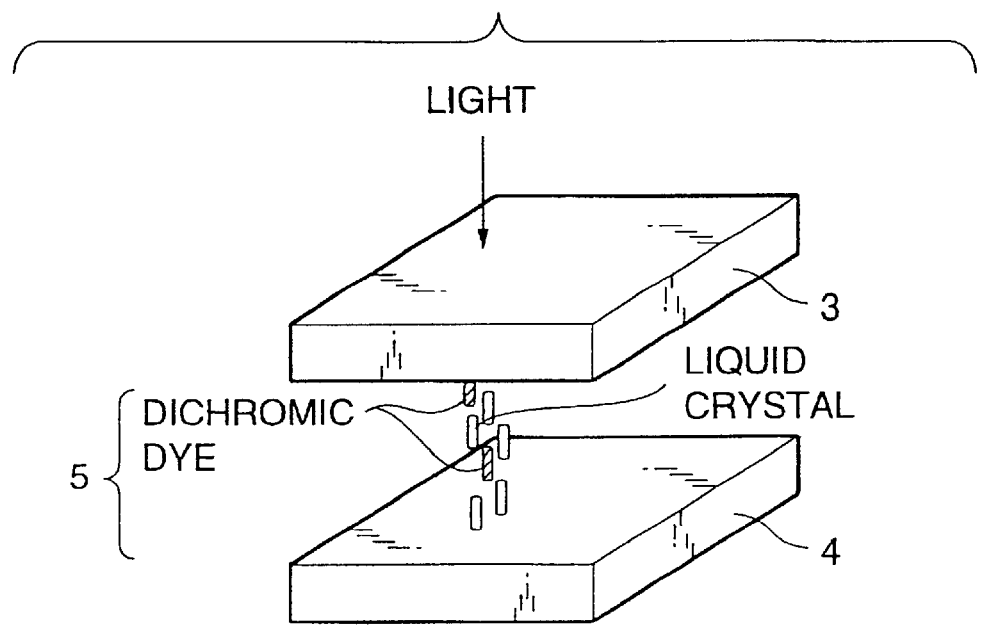
FIG. 5 is a schematic diagram showing the first mode of orientation of the quest-host liquid crystal in the operation of the first embodiment where the polarizing plate is unloaded.
Figure 6:
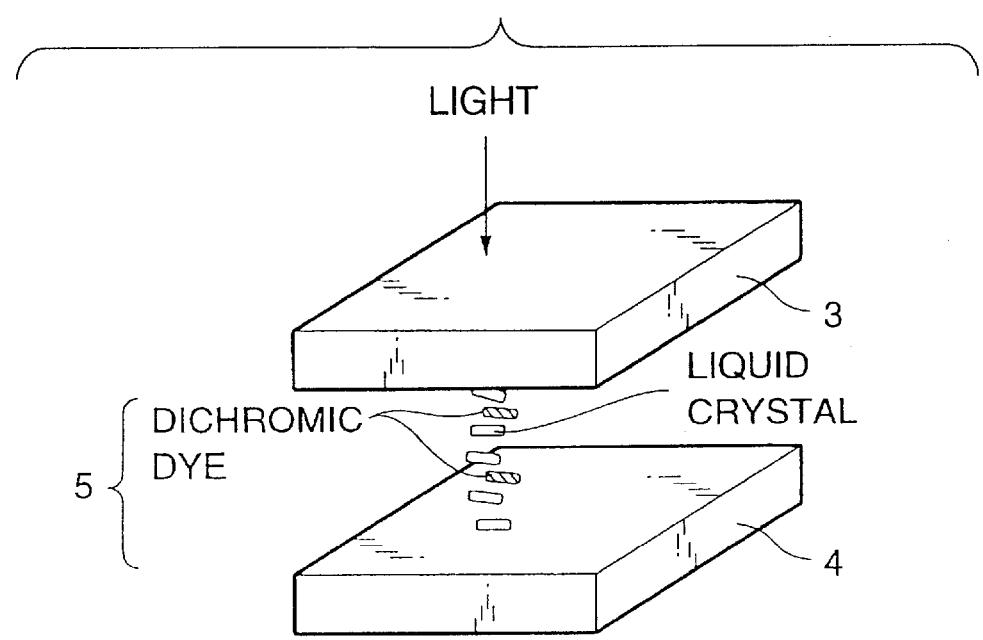
FIG. 6 is a schematic diagram showing the second mode of orientation of the guest-host liquid crystal in the operation of the first embodiment where the polarizing plate is unloaded.

The state shown in FIG. 2B where the polarizing plate 101 is unloaded from the light path toward the liquid crystal cell. 102 will be described with reference to FIGS. 5 and 6. For example, when the liquid crystal molecules are controlled by an electric field (off) between the substrates 3 and 4 to be oriented in the direction perpendicular to the vibration direction of the incident light (FIG. 5), substantially no absorption of the incident light occurs by the dichroic dye, and the amount of transmitted light becomes maximum.

When the liquid crystal molecules are controlled by an electric field between the substrates 3 and 4 to be oriented in the direction parallel to the vibration direction of the incident light (FIG. 6), the amount of light is decreased in the amount absorbed by the dichroic dye.

By employing the constitution described in the foregoing, which contains the combination of the polarizing plate 101 that can be loaded and unloaded in the light path and the guest-host type liquid crystal cell 102 (a nematic liquid crystal cell containing a dichroic dye), adjustment of change of a light amount can be conducted in a wide range.

That is, when the polarizing plate 101 is loaded in the light path, and the liquid crystal molecules are controlled to be oriented in the direction parallel to the vibration direction of the light polarized by the polarizing plate 101, the polarized light is absorbed by the dichroic dye, and thus the amount of transmitted light becomes minimum. On the other hand, when the polarizing plate 101 is unloaded from the light path, and the liquid crystal molecules are controlled to be oriented in the direction perpendicular to the vibration direction of the incident light, the light is not absorbed by the dichroic dye, and thus the amount of transmitted light becomes maximum.

Furthermore, in order that the adjusted light has a neutral color tone, the plural dichroic dyes are mixed, the dichroic ratios and the orientation degrees of which substantially agree with each other, and therefore the amount of light can be controlled to a desired intermediate tone without occurrence of change in color tone.

Figure 7:
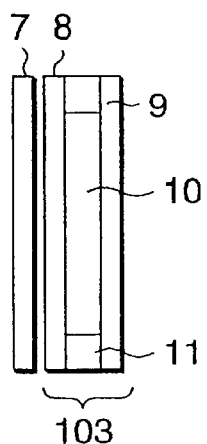
FIG. 7 is a schematic diagram of an important part of an example of the second embodiment of a filter for adjusting an amount of light of the invention.

FIG. 7 is a schematic diagram showing the important part of the second embodiment of the filter for adjusting an amount of light of the invention. On the incident light side of the light path, an ND filter 7 is attached, for example, to aperture blades not shown in the figure instead of the polarizing plate 101 in the first embodiment.

It A liquid crystal cell 103 of a guest-host type is arranged directly on a back surface of the ND filter 7. The liquid crystal cell 103 has a structure, in which two transparent substrates 8 and 9 are adhered each other with a sealing material 11 maintaining a prescribed gap, and a guest-host type liquid crystal 10 is filled in the gap.

The guest-host type liquid crystal 5 is a liquid crystal system formed by adding a dichroic dye in a liquid crystal, but the mode thereof is different from that used in the first embodiment. As the liquid crystal for the guest-host type liquid crystal 10, a liquid crystal of a phase change type is used, which changes from the cholesteric phase to the nematic phase by an electric field. It is generally called as the White-Tailor mode in the art of liquid crystals.

The dichroic dye used in the liquid crystal cell 103 is also preferably a dye having absorbance and dichroic ratio. In order that the adjusted light has a neutral color tone, it is preferred that plural dichroic dyes are mixed, and the characteristic parameters of the mixed dichroic dyes substantially agree with each other.

In the phase change mode, hysteresis is observed when the voltage is increased and decreased, which is confirmed to be minimum in a twist angle of the liquid crystal of from 230 to 250°. The filter of the second embodiment is necessarily designed to have the twist angle of the liquid crystal inside the scope.

Figure 8A:
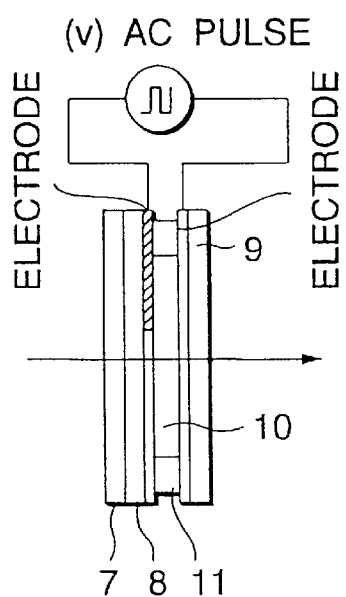
FIG. 8A is a schematic diagram showing operation of the second embodiment where the ND filter is loaded.
Figure 8B:
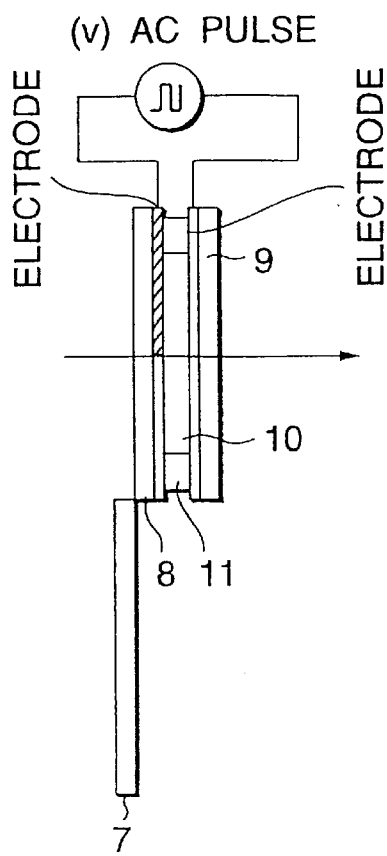
FIG. 8B is a schematic diagram showing operation of the second embodiment where the ND filter is unloaded.

FIGS. 8A and 8B are schematic diagrams showing the mode of operation of the filter for adjusting an amount of light having the constitution shown in FIG. 7. In the combination of the ND filter 7 and the guest-host type liquid crystal cell 103 shown in FIG. 7, the ND filter 7 can be loaded and unloaded in the light path toward the liquid crystal cell 103.

Figure 9:
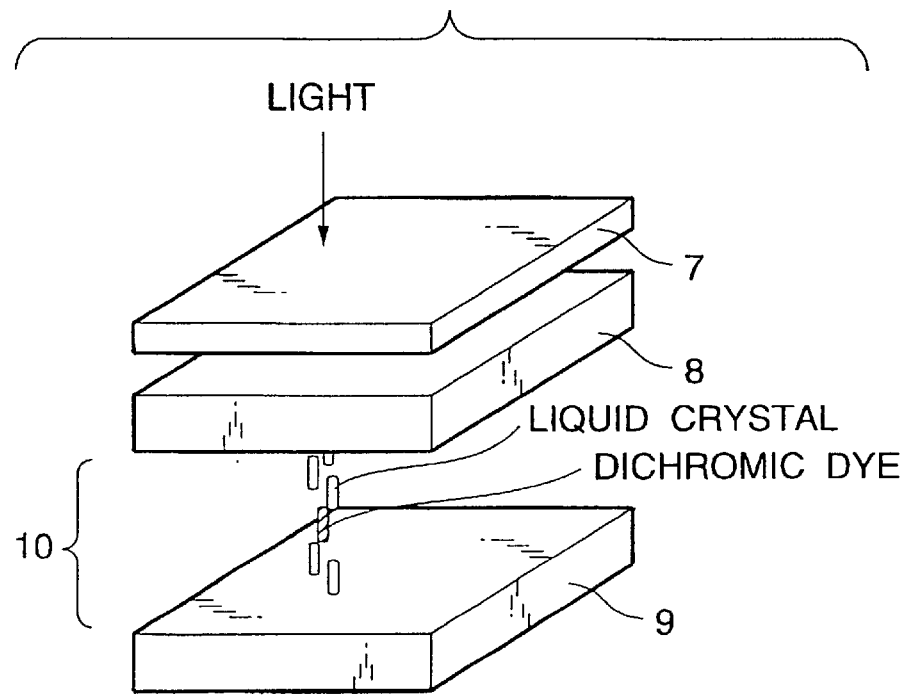
FIG. 9 is a schematic diagram showing the first mode of orientation of the guest-host liquid crystal in the operation of the second embodiment where the ND filter is loaded.

The state shown in FIG. 8A where the ND filter 7 is loaded in the light path toward the liquid crystal cell 103 will be described with reference to FIGS. 9 and 10. For example, when the liquid crystal molecules are controlled by an electric field between the substrates 8 and 9 to be oriented in the direction perpendicular to the vibration direction of the light passing the ND filter 7, substantially no absorption occurs by the dichroic dye to transmit the light (FIG. 8).

Figure 10:
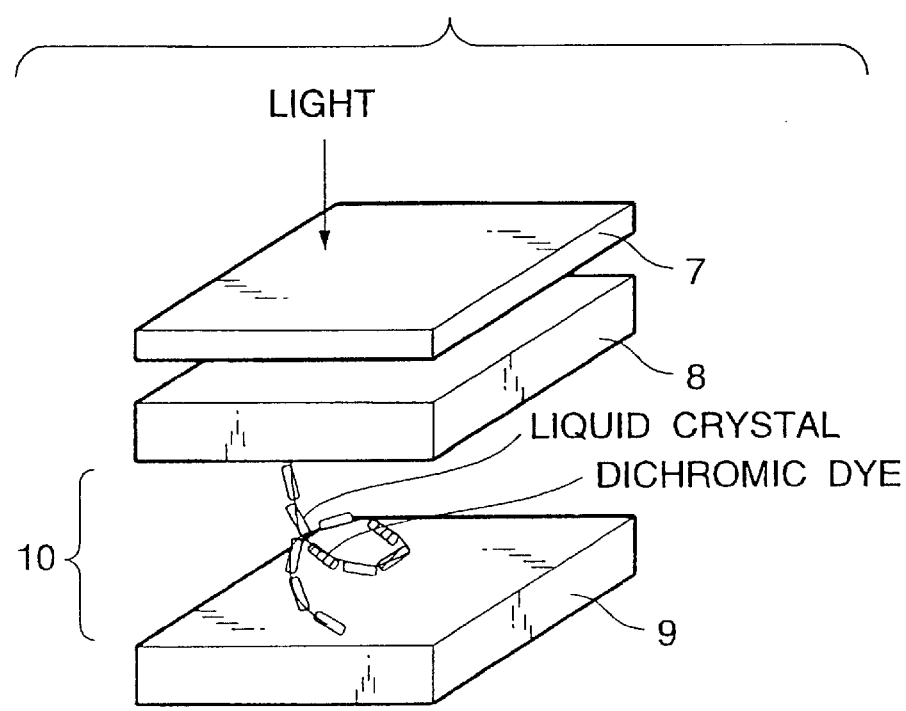
FIG. 10 is a schematic diagram showing the second mode of orientation of the guest-host liquid crystal in the operation of the second embodiment where the ND filter is loaded.

When the liquid crystal molecules are controlled by an electric field between the substrates 8 and 9 to be twisted in the direction parallel to the vibration direction of the light passing the ND filter 7, the light is absorbed by the dichroic dye, and the amount of transmitted light is decreased (FIG. 10). Thus, when the liquid crystal is twisted in the direction parallel to the substrates 8 and 9, the amount of transmitted light becomes the minimum.

Figure 11:
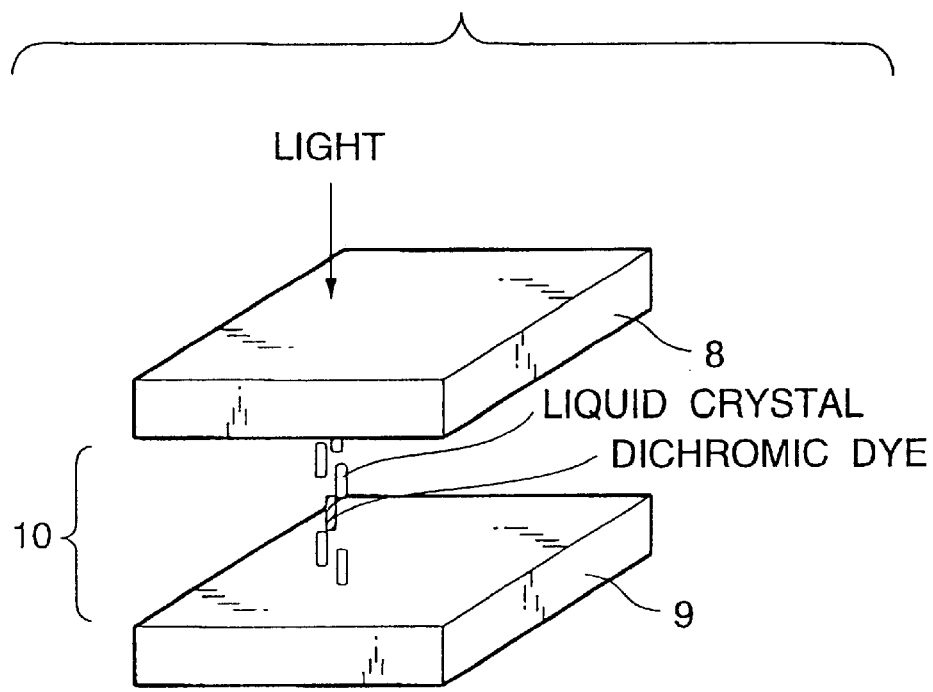
FIG. 11 is a schematic diagram showing the first mode of orientation of the guest-host liquid crystal in the operation of the second embodiment where the ND filter is unloaded.
Figure 12:
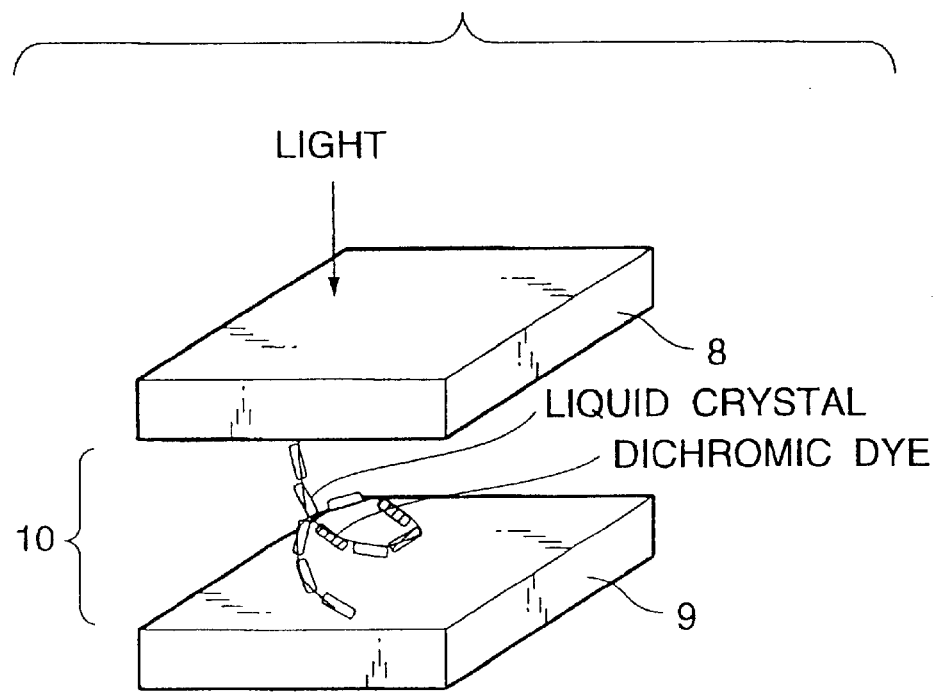
FIG. 12 is a schematic diagram showing the second mode of orientation of the guest-host liquid crystal in the operation of the second embodiment where the ND filter is unloaded.

The state shown in FIG. 8B where the ND filter 7 is unloaded from the light path toward the liquid crystal cell 103 will be described with reference to FIGS. 11 and 12. For example, when the liquid crystal molecules are controlled by an electric field between the substrates 8 and 9 to be oriented in the direction perpendicular to the vibration direction of the incident light (FIG. 11), substantially no absorption of the incident light occurs by the dichroic dye, and the amount of transmitted light becomes maximum.

When the liquid crystal molecules are controlled by an electric field between the substrates 8 and 9 to be oriented in the direction parallel to the substrates (FIG. 12), the dichroic dye is oriented in all the directions, and the amount of transmitted light is decreased by the amount absorbed by the dichroic dye.

By employing the constitution described in the foregoing, which contains the combination of the ND filter 7 that can be loaded and unloaded in the light path and the guest-host type liquid crystal cell 103 (a phase change type liquid crystal cell containing a dichroic dye), adjustment of change of a light amount can be conducted in a wide range.

That is, when the ND filter 7 is loaded in the light path, and the liquid crystal molecules are controlled to be twisted and oriented in the direction parallel to the vibration direction of the light passing through the ND filter 7, the light is absorbed by the dichroic dye, and thus the amount of transmitted light becomes minimum. On the other hand, when the ND filter 7 is unloaded from the light path, and the liquid crystal molecules are controlled to be oriented in the direction perpendicular to the vibration direction of the incident light, the light is not absorbed by the dichroic dye, and thus the amount of transmitted light becomes maximum.

Furthermore, in order to obtain a neutral color tone, the plural dichroic dyes are mixed, the dichroic ratios and the absorbance of which substantially agree with each other, and therefore the amount of light can be controlled to a desired intermediate tone without occurrence of change in color tone. Moreover, in the second embodiment, because the phase change type liquid crystal is used, which is oriented by changing from the cholesteric phase to the nematic phase, the amount of light can be controlled irrespective to polarization of light.

That is, one of the characteristic features of the second embodiment is that the light is not polarized light. Although no problem occurs on taking ordinary pictures, in the case where polarized light, such as reflected light from water surface, is incident, a problem occurs in the first embodiment due to the use of the polarizing plate 101. In order to avoid the problem, a depolarizer not shown in the figures is necessarily provided on the incident side of the polarizing plate 101. On the other hand, because the second embodiment does not utilize polarized light, the problem can be avoided without providing a depolarizer.

One embodiment of a process for producing the filter for adjusting an amount of light shown in FIG. 1 according to the first embodiment of the invention will be described below.

On a glass substrate having an ITO transparent electrode (not shown in the figures), an oriented film (not shown in the figures) having a perpendicular orientation property including the ITO is formed by a spin coating method. In order to harden the orientation film, it is pre-baked at 80° C. for 10 minutes and then baked at 180° C. for 1 hour. Two of the resulting substrates are adhered in such a manner that the electrodes face each other, so as to form a cell. One of the orientation films is subjected to a rubbing treatment. A sealing material 6 containing a spacer is coated with a dispenser, and the two substrates are adhered to each other. After temporarily sticking the sealing material 6 with an ultraviolet ray, it is subjected to heat hardening at 150° C. for 1 hour to produce a vacant cell. The guest-host type liquid crystal 5 using an n-type nematic liquid crystal is injected in the vacant cell to complete the liquid crystal cell 102. A lead wire (not shown in the figures) is connected to the electrode, whereby the liquid crystal cell can be operated.

The resulting guest-host type liquid crystal cell 102 is combined with a polarizing plate 101 formed by adhering a polarizing film 1 to a glass substrate 2, so as to complete an optical filter that can be operated by an electric field to adjust an amount of light.

One embodiment of a process for producing the filter for adjusting an amount of light shown in FIG. 7 according to the second embodiment of the invention will be described below.

On a glass substrate having an ITO transparent electrode (not shown in the figures), an oriented film (not shown in the figures) having a perpendicular orientation property including the ITO is formed by a spin coating method. In order to harden the orientation film, it is pre-baked at 80° C. for 10 minutes and then baked at 180° C. for 1 hour. Two of the baked substrates are adhered in such a manner that the electrodes face each other, and the twist angle (the rubbing direction) becomes 240°, so as to form a cell. As similar to the production of the first embodiment, the substrates are adhered to each other by using a sealing material 11 containing a spacer. After temporarily sticking the sealing material 11 with an ultraviolet ray, it is subjected to heat hardening at 150° C. for 1 hour to produce a vacant cell. The guest-host type liquid crystal 10 using a phase change type liquid crystal is injected in the vacant cell to complete the liquid crystal cell 103. A lead wire (not shown in the figures) is connected to the electrode, whereby the liquid crystal cell can be operated.

The resulting guest-host type liquid crystal cell 103 is combined with an ND filter 7 (formed by adhering an ND filter to a glass substrate), so as to complete an optical filter that can be operated by an electric field to adjust an amount of light.

Figure 13:
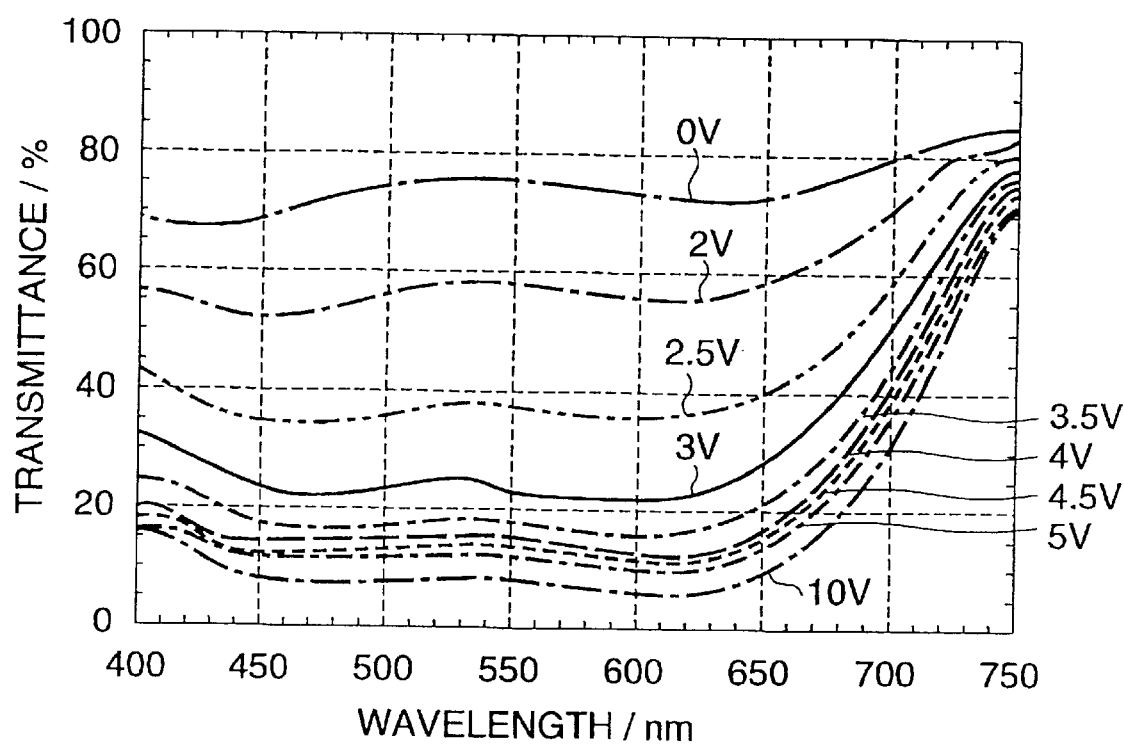
FIG. 13 is a graph showing a characteristic diagram of the change of the transmittance and the change of the spectrum characteristics of the guest-host type liquid crystal cell relating to the first embodiment.

FIG. 13 is a graph showing a characteristic diagram of the change of the transmittance and the change of the spectrum characteristics of the guest-host type liquid crystal cell 102 relating to the first embodiment. While the transmittance where only the polarizing plate 101 is applied is designated as 100%, the diagram shows the change in transmittance and spectrum of the transmitted light depending on the voltage for controlling the electric field in the guest-host type liquid crystal cell 102 where the polarizing plate 101 is loaded in the light path. It is understood from the characteristic diagram that the light amount controlling characteristics and the color tone changing characteristics of the adjusted light satisfy the objects of the invention.

Figure 14:
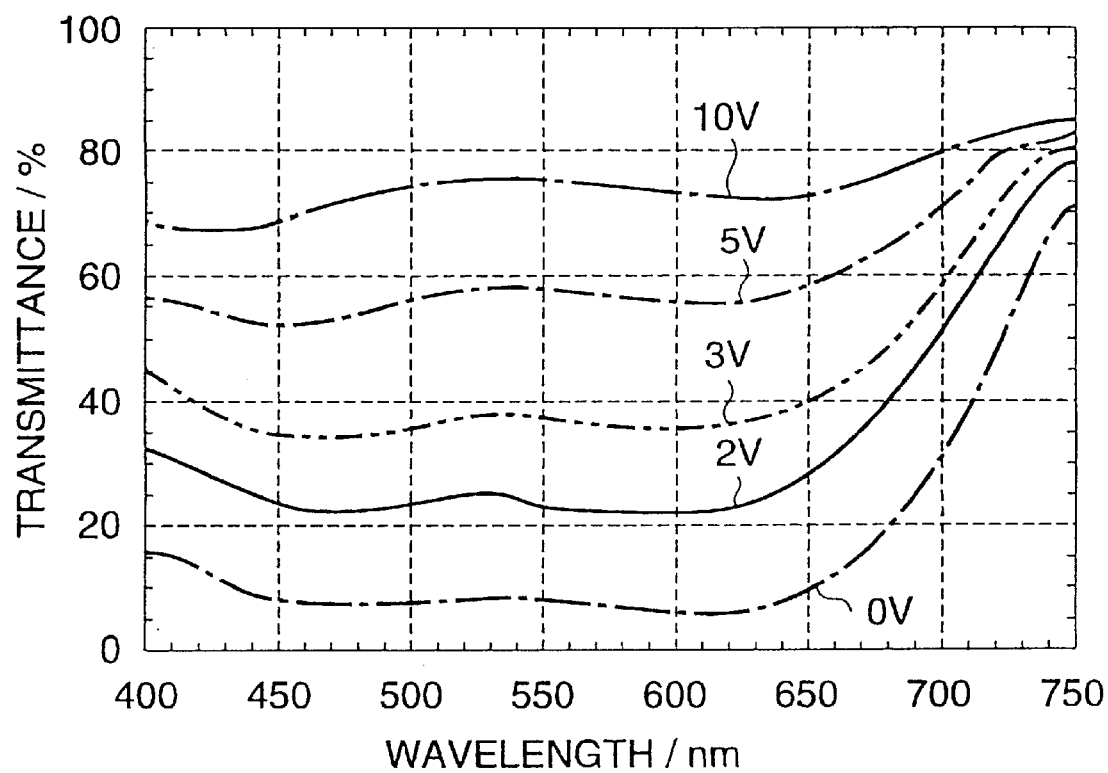
FIG. 14 is a graph showing a characteristic diagram of the change of the transmittance and the change of the spectrum characteristics of the guest-host type liquid crystal cell relating to the second embodiment.

FIG. 14 is a graph showing a characteristic diagram of the change of the transmittance and the change of the spectrum characteristics of the guest-host type liquid crystal cell 103 relating to the second embodiment. While the transmittance where only the ND filter 7 is applied is designated as 100%, the diagram shows the change in transmittance and spectrum of the transmitted light depending on the voltage for controlling the electric field in the guest-host type liquid crystal cell 103 where the ND filter 7 is loaded in the light path. It is understood from the characteristic diagram that the light amount controlling characteristics and the color tone changing characteristics of the adjusted light satisfy the objects of the invention.

What is claimed is:

1. A filter for adjusting an amount of light comprising a liquid crystal cell comprising two transparent substrates each having a transparent electrode facing each other and arranged to make a gap, and a liquid crystal filled in said gap between said transparent substrates, a controlling voltage being applied to said liquid crystal cell through said transparent electrodes to adjust an amount of light transmitted through said liquid crystal cell, said filter for adjusting an amount of light further comprising:
a polarizing plate for polarizing incident light on a light path incident on said liquid crystal cell,
a mechanism for loading and unloading said polarizing plate in said incident light path,
terminals for applying said controlling voltage to said transparent electrodes, and
a dichroic dye added to said liquid crystal.

2. A filter for adjusting an amount of light as claimed in claim 1, wherein said liquid crystal is a nematic liquid crystal that is oriented through nematic phase change by said controlling voltage, and orientation of said liquid crystal is changed by said controlling voltage.

3. A filter for adjusting an amount of light as claimed in claim 1, wherein said liquid crystal is a guest-host type liquid crystal containing plurality of said dichroic dyes, which have dichroic ratios and orientation degrees to said liquid crystal that substantially agree with each other.

4. A filter for adjusting an amount of light as claimed in claim 1, wherein said guest-host type liquid crystal has transmittance that is substantially constant to wavelength in a visible region irrespective to said controlling voltage.

5. A filter for adjusting an amount of light comprising a liquid crystal cell comprising two transparent substrates each having a transparent electrode facing each other and arranged to make a gap, and a liquid crystal filled in said gap between said transparent substrates, a controlling voltage being applied to said liquid crystal cell through said transparent electrodes to adjust an amount of light transmitted through said liquid crystal cell, said filter for adjusting an amount of light further comprising:
an optical filter for setting transmittance of incident light on a light path incident on said liquid crystal cell,
a mechanism for loading and unloading said optical filter in said incident light path,
terminals for applying said controlling voltage to said transparent electrodes, and
a dichroic dye added to said liquid crystal.

6. A filter for adjusting an amount of light as claimed in claim 5, wherein liquid crystal is oriented through phase change from the cholesteric phase to the nematic phase by said controlling voltage.

7. A filter for adjusting an amount of light as claimed in claim 5, wherein said liquid crystal is a guest-host type liquid crystal containing plurality of said dichroic dyes, which have dichroic ratios and orientation degrees to said liquid crystal that substantially agree with each other.

8. A filter for adjusting an amount of light as claimed in claim 5, wherein said liquid crystal has a maximum twisted angle of from 230 to 250° on application of said controlling voltage.

9. A filter for adjusting an amount of light as claimed in claim 5, wherein said optical filter has optical characteristics that are substantially constant in a wavelength region of said incident light.

10. A filter for adjusting an amount of light as claimed in claim 5, wherein said guest-host type liquid crystal has transmittance that is substantially constant to wavelength in a visible region irrespective to said controlling voltage.

11. A filter for adjusting an amount of light comprising a liquid crystal cell comprising two transparent substrates each having a transparent electrode facing each other and arranged to make a gap, and a liquid crystal filled in said gap between said transparent substrates, a controlling voltage being applied to said liquid crystal cell through said transparent electrodes to adjust an amount of light transmitted through said liquid crystal cell, said filter for adjusting an amount of light further comprising:
terminals for applying said controlling voltage to said transparent electrodes, and
a dichroic dye added to said liquid crystal.

12. A filter for adjusting an amount of light as claimed in claim 11, wherein said liquid crystal is a nematic liquid crystal that is oriented through nematic phase change by said controlling voltage, and orientation of said liquid crystal is changed by said controlling voltage.

13. A filter for adjusting an amount of light as claimed in claim 11, wherein said liquid crystal is a guest-host type liquid crystal containing plurality of said dichroic dyes, which have dichroic ratios and orientation degrees to said liquid crystal that substantially agree with each other.

14. A filter for adjusting an amount of light as claimed in claim 11, wherein said guest-host type liquid crystal has transmittance that is substantially constant to wavelength in a visible region irrespective to said controlling voltage.

15. A filter for adjusting an amount of light comprising a liquid crystal cell comprising two transparent substrates each having a transparent electrode facing each other and arranged to make a gap, and a liquid crystal filled in said gap between said transparent substrates, a controlling voltage being applied to said liquid crystal cell through said transparent electrodes to adjust an amount of light transmitted through said liquid crystal cell, said filter for adjusting an amount of light further comprising:
an optical filter for setting transmittance of incident light on a light path incident on said liquid crystal cell,
an aperture blade for loading and unloading said optical filter in said incident light path, and
a dichroic dye added to said liquid crystal.

16. A filter for adjusting an amount of light as claimed in claim 15, wherein liquid crystal is oriented through phase change from the cholesteric phase to the nematic phase by said controlling voltage.

17. A filter for adjusting an amount of light as claimed in claim 15, wherein said liquid crystal is a guest-host type liquid crystal containing plurality of said dichroic dyes, which have dichroic ratios and orientation degrees to said controlling voltage that substantially agree with each other.

18. A filter for adjusting an amount of light as claimed in claim 15, wherein said liquid crystal has a maximum twisted angle of from 230 to 250° on application of said controlling voltage.

19. A filter for adjusting an amount of light as claimed in claim 15, wherein the amount of light transmitted through said optical filter is substantially constant in a wavelength region of said incident light for a constant controlling voltage.

20. A filter for adjusting an amount of light as claimed in claim 15, wherein said guest-host type liquid crystal has transmittance that is substantially constant in a visible region for a constant controlling voltage.

* * * * *